Dec. 11, 1956     E. E. HOOD     2,773,379
FREEZEMETER
Filed July 27, 1953

WITNESS:
Esther M. Stockton

INVENTOR.
E. Elliott Hood
BY
Clinton & Janes
ATTORNEY

United States Patent Office 2,773,379
Patented Dec. 11, 1956

2,773,379

FREEZEMETER

E. Elliott Hood, Elmira, N. Y., assignor to Bendix Aviation Corporation, a corporation of Delaware Application July 27, 1953, Serial No. 370,381

2 Claims. (Cl. 73—17)

The present invention relates to a freeze-test meter for arctic coolant liquids for internal combustion engines and more particularly to improved means for agitating a sample of the liquid as it is being frozen, in order to promote crystallization of the sample and to accelerate the response of the test thermometer to changes in temperature of the sample.

It is an object of the present invention to provide a novel freeze-test meter in which the sample of liquid to be frozen comes into direct contact with the stem of the test thermometer, and incorporating a convenient means for thoroughly agitating the sample during the freezing process.

It is another object to provide such a device in which the agitation of the sample is brought about by means which is heat conductive in nature, and is not dependent upon relative movement of the thermometer and sample holder.

Figure 1:
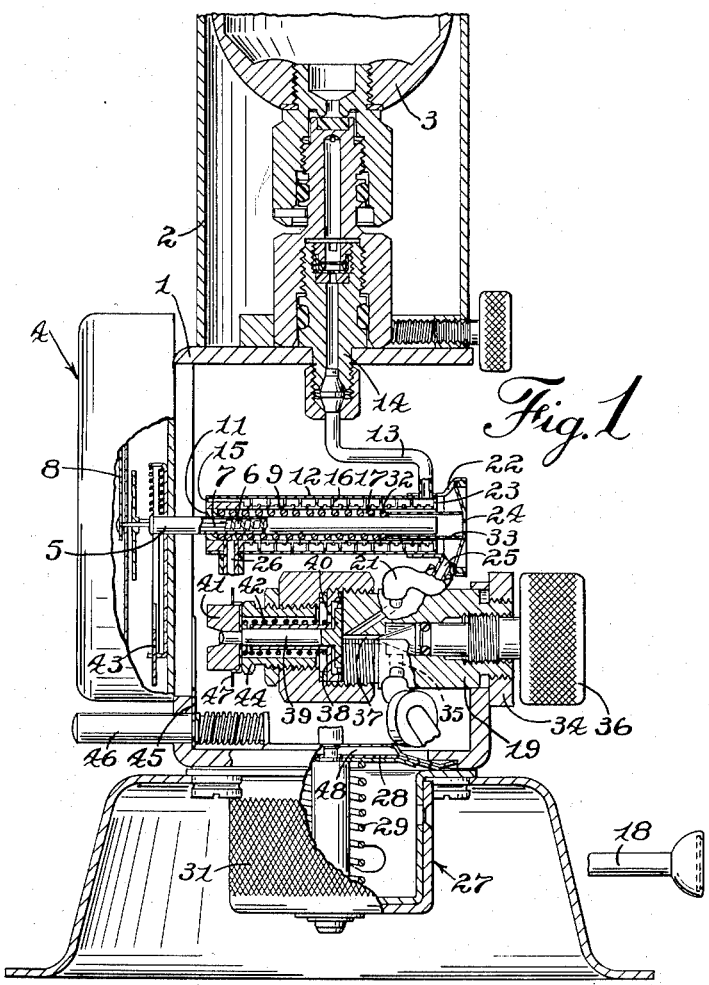
Figure 2:
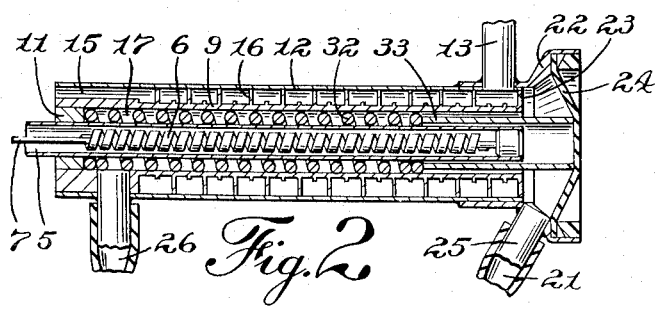

Further objects and advantages will be apparent from the following description taken in connection with the accompanying drawing in which:

Fig. 1 is a vertical substantially mid-sectional view of a preferred embodiment of the invention; and Fig. 2 is an enlarged sectional view of the heat exchanger and sample holding and agitating structure.

In Fig. 1 of the drawing there is illustrated a frame 1 on which is mounted in any suitable manner a holder 2 for a pressure flask 3 holding a freezing medium such as liquefied carbon dioxide.

A thermometer 4 is mounted on the frame 1 and is provided with a smooth cylindrical stem 5 extending horizontally within the frame and containing a bimetallic temperature-sensitive element 6 which actuates a shaft 7 on which the indicating needle 8 is mounted. A frost tube 9 (Fig. 2) is mounted on the portion of the thermometer stem 5 containing the temperature responsive element 6. The frost tube is substantially larger in internal diameter than the external diameter of the thermometer stem, and is maintained in coaxial relation therewith by means of a sealing bushing 11.

A heat exchanger housing member 12 is mounted on the frost tube 9 and is connected at one end by a conduit 13 to the outlet 14 of the storage flask. This end of the housing is closed by an annular flange 23, while the opposite end of the housing is left open as shown at 15, and the frost tube and housing are provided with baffles 16 providing a tortuous path for expanded carbon dioxide gas and snow admitted from said flask.

The space 17 surrounding the thermometer stem 5 within the frost tube 9 forms a holder for a sample of the liquid to be tested, and means for introducing such a sample is provided comprising an inlet tube 18 which is connected to a hollow tubular fitting 19, which in turn is connected by a tube 21 to one end of the sample holding space 17. For this purpose, a funnel-shaped sleeve 22 is fixedly mounted on the housing 12 and provided with a nipple 25 for reception of the tube 21. The sleeve 22 is closed by a flexible diaphragm 24, and the opposite end of the sample holding space 17 is connected by a tube 26 to a rotary type of pump 27 comprising a flexible diaphragm 28 which may be retracted against the pressure of a spring 29 to draw a sample through the sample holder, by manipulation of an actuating cap 31.

According to the present invention, means are provided within the space 17 in which the sample is to be frozen, for agitating the sample and for promoting the transfer of heat through the sample between the frost tube and the thermometer stem. As best shown in Fig. 2, this means comprises a coiled spring 32 having spaced convolutions of a heat-conductive material such as phosphor bronze, loosely mounted in the space 17 and held under a slight initial compression by means of a sleeve 33 slidably mounted in said space and projecting therefrom into engagement with the flexible diaphragm 24.

The fitting 19 is rigidly mounted on the frame 1 as by means of a clamp nut 34 and is provided with a passage 35, controlled by a manually operable needle valve 36, opening into a passage 37 to which the conduit 21 is connected. The passage 37 is closed by a flexible diaphragm 38 which is engaged on its outer side by a flanged thrust member 40 which abuts against a slidable shaft 39. Shaft 39 carries on its outer end a permanent magnet 41 which, when released, is movable by a spring 42 into position to actuate an arresting means for the thermometer needle indicated generally by the numeral 43. The magnet 41 is normally maintained in the position illustrated by its attraction to a keeper-sleeve 44 of magnetic material threaded in the fitting 19 to form an adjustable retaining means for the magnet.

Means for restoring the magnet to its retracted position after having been released is provided in the form of a fork member 45 of nonmagnetic material mounted on a manually operable plunger 46 in position to engage a spacing collar 47 of nonmagnetic material mounted on the magnet shaft 39.

In operation, a sample of the liquid to be tested is drawn in through the inlet tube 18, through the sample holder 17 and into the space 48 above the pump diaphragm 28, by manipulation of the pump member 31. Carbon dioxide gas and snow are then admitted from the flask 3 through the conduit 13 to the heat exchanger 12 from which it escapes at 15 after extracting heat from the frost tube 9. As the sample in the space 17 is thus cooled, a pulsating pressure is applied manually to the diaphragm 24 thus compressing the spring 32 and allowing it to expand so as to thoroughly agitate the sample of liquid by passage through and between the convolutions of the spring. At the same time, the spring itself, being a good heat conductor, assists in equalizing the temperature of the frost tube, sample and thermometer stem by direct contact with all three. By this means the sample is rapidly frozen, and the thermometer shows the temperature of the sample with very little time lag.

After the sample is frozen, needle valve 36 is closed and the pump member 31 is released, thus permitting the spring 29 to apply pressure to the pump diaphragm 28 tending to eject the sample. When the sample thaws sufficiently to permit this pressure to be transmitted to the diaphragm 38, the latter expands and pushes the magnet 41 away from the sleeve 44 whereupon the spring 42 is effective to cause the magnet to move into engagement with the casing of the thermometer 4 and thus actuate the arresting means 43 for the thermometer needle 8.

Although but one form of the invention has been shown and described in detail, it will be understood that changes may be made in the design and arrangement of parts without departing from the spirit of the invention.

I claim:

1. In a device for determining the freezing point of liquid coolants for internal combustion engines, a thermometer having a smooth cylindrical stem, a frost tube of substantially larger diameter than said stem coaxially mounted thereon, means adjacent the ends of the tube for sealing the space between the thermometer stem and the interior of the tube, means for introducing a sample of liquid to be tested in said space, means for cooling the tube below the freezing point of the sample, heat conductive movable means in said space in contact with the thermometer stem and the interior wall of the frost tube, for agitating the sample of liquid and promoting transfer of heat through said space, and manually operable means for actuating said movable means; in which the movable means comprises a coiled spring having spaced convolutions loosely fitting in the space around the thermometer stem within said frost tube.

2. A device as set forth in claim 1 in which the sealing means includes a flexible diaphragm closing one end of the frost tube, and including further a sleeve loosely slidable in said space, interposed between the spring and diaphragm and movable by flexure of the diaphragm to compress the spring.

References Cited in the file of this patent
UNITED STATES PATENTS

| | | |
|---|---|---|
| 1,148,351 | Burns et al. | July 27, 1915 |
| 1,443,537 | Hortvet | Jan. 30, 1923 |
| 2,426,368 | Mayne et al. | Aug. 26, 1947 |
| 2,633,736 | Dickey | Apr. 7, 1953 |

FOREIGN PATENTS

| | | |
|---|---|---|
| 474,285 | Canada | June 5, 1951 |

OTHER REFERENCES

Article: A Mechanically Stirred Melting Point Apparatus, by Dedman in Journal of Scientific Instrument, vol. 21, October 1944, pp. 185–186.